(12) United States Patent
Shan et al.

(10) Patent No.: US 8,173,261 B2
(45) Date of Patent: *May 8, 2012

(54) FINE CARBON FIBROUS STRUCTURE

(75) Inventors: Jiayi Shan, Tokyo (JP); Takayuki Tsukada, Tokyo (JP); Fuminori Munekane, Tokyo (JP)

(73) Assignee: Hodogaya Chemical Co., Ltd, Tokyo (JP)

( * ) Notice: Subject to any disclaimer, the term of this patent is extended or adjusted under 35 U.S.C. 154(b) by 587 days.

This patent is subject to a terminal disclaimer.

(21) Appl. No.: 12/282,336

(22) PCT Filed: Mar. 8, 2007

(86) PCT No.: PCT/JP2007/054521
§ 371 (c)(1),
(2), (4) Date: Sep. 9, 2008

(87) PCT Pub. No.: WO2007/102575
PCT Pub. Date: Sep. 13, 2007

(65) Prior Publication Data
US 2009/0087638 A1    Apr. 2, 2009

(30) Foreign Application Priority Data
Mar. 9, 2006    (JP) .................................. 2006-64102

(51) Int. Cl.
*B32B 9/00*    (2006.01)
(52) U.S. Cl. .................. 428/408; 423/447.1; 423/447.2; 428/367
(58) Field of Classification Search .................. 428/367, 428/408; 423/447.1, 447.2
See application file for complete search history.

(56) References Cited

U.S. PATENT DOCUMENTS

| 5,171,560 | A | * | 12/1992 | Tennent | 423/447.3 |
| 6,844,061 | B2 | * | 1/2005 | Morita et al. | 428/367 |
| 6,974,627 | B2 | * | 12/2005 | Morita et al. | 428/367 |
| 7,011,884 | B1 | * | 3/2006 | Chow et al. | 428/367 |
| 7,229,944 | B2 | * | 6/2007 | Shao-Horn et al. | 502/182 |
| 7,396,798 | B2 | * | 7/2008 | Ma et al. | 502/185 |
| 7,824,768 | B2 | * | 11/2010 | Shan et al. | 428/370 |
| 7,955,699 | B2 | * | 6/2011 | Handa et al. | 428/408 |
| 2008/0254296 | A1 | * | 10/2008 | Handa et al. | 428/408 |
| 2009/0087638 | A1 | * | 4/2009 | Shan et al. | 428/292.1 |
| 2009/0162636 | A1 | * | 6/2009 | Shan et al. | 428/323 |
| 2011/0045273 | A1 | * | 2/2011 | Handa et al. | 428/293.1 |

FOREIGN PATENT DOCUMENTS

JP    2002266170 A    9/2002

(Continued)

*Primary Examiner* — N. Edwards
(74) *Attorney, Agent, or Firm* — Sughrue Mion, PLLC (57) ABSTRACT

Disclosed is a fine carbon fibrous structure which comprises carbon fibers and granular parts, wherein at least two granular parts connect by at least one of the carbon fibers; wherein the fine carbon fibrous structure have a $D_2/D_1$ ratio of 1.3 to 10, wherein the $D_1$ is the median diameter of outer diameters of the carbon fibers and the $D_2$ is the area-based circle-equivalent median diameter of the particles; wherein the granular parts have a $D_2$ of 0.05 to 0.4 μm; wherein the carbon fibers have a median length of not more than 20 μm; wherein the granular parts are produced in a growth process of the carbon fibers; and wherein at least a graphene layer which exists on and constitutes the surface of each granular part is continued on a graphene layer which exists on and constitutes the surface of the carbon fiber which connects between the granular parts.

13 Claims, 2 Drawing Sheets

FOREIGN PATENT DOCUMENTS

| | | |
|---|---|---|
| JP | 2003227039 A | 8/2003 |
| JP | 2004176244 A | 6/2004 |
| JP | 2004-339676 A | 12/2004 |
| JP | 3720044 B1 | 9/2005 |
| WO | 2005095687 A1 | 10/2005 |
| WO | 2006025462 A1 | 3/2006 |
| WO | 2006100809 A1 | 9/2006 |
| WO | 2006100877 A1 | 9/2006 |
| WO | 2006117924 A1 | 11/2006 |
| WO | 2007102575 A1 | 9/2007 |

* cited by examiner

FINE CARBON FIBROUS STRUCTURE

TECHNICAL FIELD

This invention relates to fine carbon fibrous structures. In details, this invention relates to fine carbon fibrous structures which can be utilized as an additive suitable for improvement in physical properties, such as electrical, mechanical, or thermal properties, of various materials, such as resins, ceramics, metals or the like; and also as an additive suitable for improvement in physical properties, such as electrical or thermal property of liquid materials, such as fuels, lubricant oils or the like. More particularly, this invention relates to fine carbon fibrous structures which can be utilized as an additive which can exhibit various physical properties while maintaining the transmittance of the material to which the additive is added.

BACKGROUND ART

As the method for manufacturing fine carbon fibers, vapor deposition method, thermally decomposing hydrocarbon such as benzene, toluene, or, xylene as a carbon source in vapor phase is known.

For instance, in Patent Literature 1, carbon fibrous structures each having a three dimensional network are disclosed, and they excels in the particle resistance. However, carbon fibrous structures which can show a particle resistance superior to those of Patent Literature 1 have been sought.

In addition, carbon fibrous structures by which an electrically conductive film having an excellent transparency can be made up have been sought.

Further, in Patent Literature 2, a vapor phase production method for carbon fibers in which at least two kinds of carbon sources are used is disclosed. However, the carbon fibers obtained by this method can not fully satisfy the demand for the particle resistance.

[Patent Literature 1] JP Patent No. 3720044
[Patent Literature 2] JP 2004-339676 A

DISCLOSURE OF TEE INVENTION

Problems to be Solved by this Invention

This invention aims to provide minute carbon fibrous structures which show particularly excellent electrical, thermal and mechanical properties and an excellent density after decompression, and by which an electrically conductive film having an excellent transparency can be made up; and also to provide a method for manufacturing thereof.

Means for Solving the Problems

The present invention provides a fine carbon fibrous structure which comprises carbon fibers and granular parts, wherein at least two granular parts connect by at least one of the carbon fibers; wherein the fine carbon fibrous structure have a $D_2/D_1$ ratio of 1.3 to 10, wherein the $D_1$ is the median diameter of outer diameters of the carbon fibers and the $D_2$ is the area-based circle-equivalent median diameter of the particles; wherein the granular parts have a $D_2$ of 0.05 to 0.4 μm: wherein the carbon fibers have a median length of not more than 20 μm; wherein the granular parts are produced in a growth process of the carbon fibers; and wherein at least a graphene layer which exists on and constitutes the surface of each granular part is continued on a graphene layer which exists on and constitutes the surface of the carbon fiber which connects between the granular parts.

Further, the present invention provides a method for production of fine carbon fibrous structure, which comprises supplying methane, benzene, a catalyst and hydrogen into a reaction furnace in accordance with the vapor phase production method for carbon fiber, wherein the molar ratio of (methane/benzene) in a gas composition which is supplied into the reaction furnace exceeds 1 and is not more than 100; wherein the percentage of hydrogen by volume in the gas composition which is supplied into the reaction furnace is not less than 10% and is less than 100%, wherein the percentage of hydrogen by volume is determined at 0° C.; and wherein the carbon fiber produced is a fine carbon fibrous structure which satisfies the following condition (hereinafter, the condition is called "condition for the carbon fibrous structure according to the present invention".):

<Fine Carbon Fibrous Structure> a fine carbon fibrous structure which comprises carbon fibers and granular parts, wherein at least two granular parts connect by at least one of the carbon fibers; wherein the fine carbon fibrous structure have a $D_2/D_1$ ratio of 1.3 to 10, wherein the $D_1$ is the median diameter of cuter diameters of the carbon fibers and the $D_2$ is the area-based circle-equivalent median diameter of the particles; wherein the granular parts have a $D_2$ of 0.05 to 0.4 m; wherein the carbon fibers have a median length of not more than 20 μm; wherein the granular parts are produced in a growth process of the carbon fibers; and wherein at least a graphene layer which exists on and constitutes the surface of each granular part is continued on a graphene layer which exists on and constitutes the surface of the carbon fiber which connects between the granular parts.

Incidentally, in the present invention, the reaction furnace means a furnace in which the carbon fibers and the granular parts are produced by using particle(s) of the catalyst as nucleus (nuclei).

Further, the present invention provides a method for production of fine carbon fibrous structure, which comprises supplying methane, toluene and/or xylene, a catalyst and hydrogen into a reaction furnace in accordance with the vapor phase production method for carbon fiber, wherein the molar ratio of (methane/(toluene and/or xylene)) in a gas composition which is supplied into the reaction furnace exceeds 1 and is not more than 100; wherein the percentage of hydrogen by volume in the gas composition which is supplied into the reaction furnace is not less than 70% and is less than 100%; and wherein the carbon fiber produced is a fine carbon fibrous structure which satisfies the condition for the carbon fibrous structure according to the present invention.

Effects of the Invention

According to the present invention, it is possible to provide minute carbon fibrous structures which show particularly excellent electrical, thermal and mechanical properties and an excellent density after decompression, and also to provide a method for manufacturing thereof.

EXPLANATION OF NUMERALS

1 Reaction furnace
2 Inlet nozzle
3 Collision member
4 Raw material supply port
a Inner diameter of inlet nozzle
b Inner diameter of reaction furnace
c Inner diameter of collision member
d Distance from upper end of reaction furnace to raw material mixture gas supply port
e Distance from raw material mixture gas supply port to lower end of collision member
f Distance from raw material mixture gas supply port to lower end of reaction furnace

BEST MODE FOR CARRYING OUT THE INVENTION

Now, the present invention will be described in detail with reference to some embodiments.
(1) Fine Carbon Fibrous Structure The fine carbon fibrous structure of the present invention satisfies the "condition for the carbon fibrous structure according to the present invention". When satisfying this condition, the carbon fibrous structure can attain the extremely excellent particle resistance desired.

Figure 1:
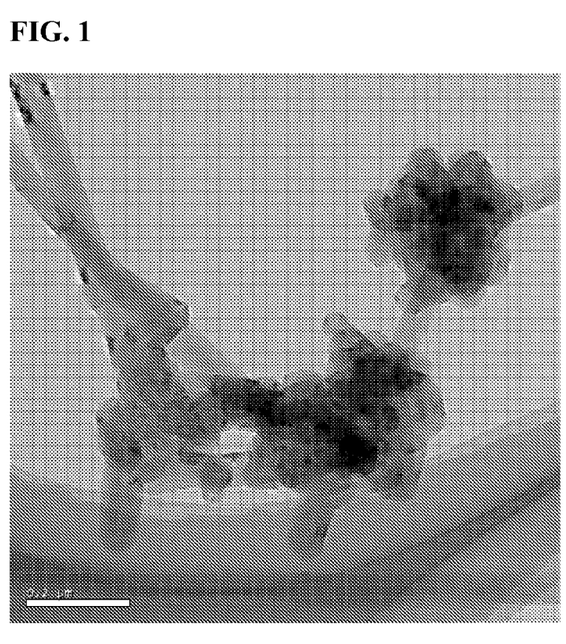
FIG. 1 is a TEM photo of a fine carbon fibrous structure (annealed product) obtained in Example 1.
Figure 2:
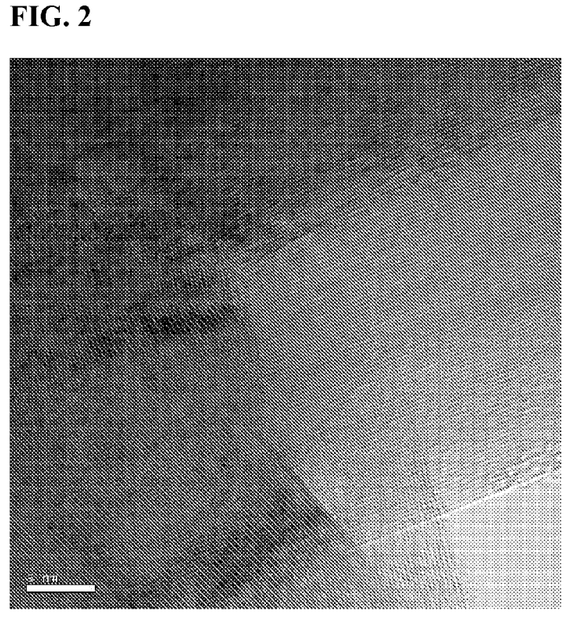
FIG. 2 is anther TEM photo of a fine carbon fibrous structure (annealed product) obtained in Example 1.

The fine carbon fibrous structure according to the present invention comprises carbon fibers and granular parts; and in the structure, at least two granular parts connect by at least one of the carbon fibers as shown in FIG. 1; the granular parts are produced in a growth process of the carbon fibers; and at least a graphene layer which exists on and constitutes the surface of each granular part is continued on a graphene layer which exists on and constitutes the surface of the carbon fiber which connects between the granular parts as shown in FIG. 2. These features are essential for the fine carbon fibrous structures of the present invention to attain the extremely excellent particle resistance desired.

Further, since in the fine carbon fibrous structures of the present invention at least two granular parts connect by at least one of the carbon fiber, the density after decompression (this denotes the bulk density which is determined by the following procedure: first; compressing aggregates of the fine carbon fibrous structures with a certain pressure; next, releasing the pressure and allowing the aggregates to recover the volume; and measuring the bulk density thereafter.) of the aggregates of the carbon fibrous structures shows a low value, and thus the recovering force in the bulk density of the carbon fibrous structures after releasing the pressure is high. Namely, after releasing the pressure, the fine carbon fibrous structures regain their inherent sparse structures.

A feature of the fine carbon fibrous structure of the present invention is that the $D_2/D_1$ ratio is in the range of 1.3-10. More preferably, $D_2/D_1$ ratio is in the range of 3-10.

In order to realize the extremely excellent particle resistance desired, it is required that the $D_2$ is in the range of 0.05 to 0.4 μm. More preferably, the $D_2$ is in the range of 0.1 to 0.4 μm.

Further, it is desirable that the median value of degrees of roundness of the granular parts lies in the range of from 0.5 to <1, preferably, 0.6 to <1, and more preferably, 0.7 to <1, in order to attain the desired particle resistance which was not attained in the prior arts.

Furthermore, as mentioned above, in the fine carbon fibrous structure according to the present invention, the granular parts connected by the carbon fiber, and the fine carbon fibrous structure show a bulky structure where the carbon fibers exist sparsely. Concretely, for instance, it is desirable that the bulk density of the fine carbon fibrous structures is in the range of $1\times10^{-3}$ g/cm$^3$ to $5\times10^{-2}$ g/cm$^3$. Because, when the bulk density is not more than $5\times10^{-2}$ g/cm$^3$, the improvement of the physical properties of a matrix such as a resin can be attained even with a small dosage. Further, it becomes possible that the density after decompression shows an extremely excellent value, for instance a value in the range of from 0.1 g/cm$^3$ to 0.5 g/cm$^3$.

Further, since the granular parts connect by the carbon fiber in the fine carbon fibrous structure according to the present invention, the fine carbon fibrous structure, per se, shows extremely excellent electrical properties, etc. For instance, the fine carbon fibrous structure has a particle resistance determined under a certain pressed density, 0.8 g/cm$^3$ being in the range of not more than 0.009Ω·cm, more preferably, 0.001 to 0.008Ω·cm. When the particle resistance of the fine carbon fibrous structures is not more than 0.009Ω·cm and such fine carbon fibrous structures are added to a matrix such as a resin, it becomes possible to form good electrically conductive paths in the matrix, and thus such a particle resistance is preferable.

Further, in order to enhance the strength and electric conductivity of the fine carbon fibrous structure, it is desirable that the graphene sheets that make up the carbon fibers have a small number of defects, and more specifically, for example, it is preferable that the $I_D/I_G$ ratio of the carbon fiber determined by Raman spectroscopy (wherein the $I_D/I_C$ in calculated from measurement values determined by Raman spectroscopic analysis using 514 nm light of the argon laser) is not more than 0.1.

Incidentally, in Raman spectroscopic analysis, with respect to a large single crystal graphite, only the peak (G band) at about 1580 cm$^{-1}$ appears. When the crystals are of finite ultrafine sizes or have any lattice defects, the peak (D band) at about 1360 cm$^{-1}$ can appear. Therefore, when the intensity ratio ($R=I_{1360}/I_{1580}=I_D/I_G$) of the D band and the G band is below the selected range as mentioned above, it is possible to say that there is little defect in graphene sheets.

Furthermore, it is desirable that the oxidation temperature of the fine carbon fibrous structure is not less than 670° C. Such a high thermal stability would be brought about by the above mentioned facts that the fine carbon fibrous structure has little defects and that the carbon fibers have a predetermined outside diameter.
(2) Method for Production of Fine Carbon Fibrous Structures Next, a method for production of fine carbon fibrous structures according to the present invention will be described.
(2-1) The Case of using Methane and Benzene as Carbon Sources for Thermal Decomposition Reaction System In the case that methane, benzene, a catalyst and hydrogen are supplied into a reaction furnace, when the molar ratio of (methane/benzene) in a gas composition which is supplied into the reaction furnace, namely, in a gas composition at the inlet of the reaction furnace, is adjusted to exceed 1 and to be not more than 100, preferably, to be in the range of from 1.1 to 50, more preferably, in the range of from 2 to 30, and the percentage of hydrogen by volume in the gas composition which is supplied into the reaction furnace is adjusted to be not less than 10% and to be less than 100%, preferably, to be in the range of from 15% to 95%, more preferably, in the range of from 20% to 90%, it becomes possible to obtain the fine carbon fibrous structures which satisfy the "condition for the carbon fibrous structure according to the present invention".

In this case, as the methane which is supplied to the reaction furnace, it is possible to recycle the methane which is contained as an unreacted form in the exhaust gas discharged from the reaction furnace.

Namely, when as raw material gases methane and benzene are used, relatively large amount of unreacted methane is remained in the exhaust gas, and thus the exhaust gas becomes a methane rich gas as compared with the methane/benzene ratio (theoretical value) in the introduced raw material gases. Thus, the exhaust gas is well worth using as methane supplying source. Recycling of the exhaust gas can contribute to reduction in the amount of carrier gas such as hydrogen, and also is preferable from the viewpoint of environmental issue since the amount of the exhaust gas discharged to the external environment can decrease.

When recycling the exhaust gas as mentioned above, it is preferable to perform the following steps of subjecting the exhaust gas discharged from the reaction furnace to dust collection using a known dust collector such as bag filter or the like in order to remove solid ingredients away from the gas, and next, subjecting thus treated gas to cooling by means of a condenser or the like into a temperature in the range of from $-20°$ C. to $40°$ C. in order to remove tar ingredient and so on away from the gas, and thereafter, analyzing the ingredients in the gas, preferably, in real time, and finally, regulating the flow rate of the gas to be fed back so as to obtain a predetermined gas composition on mixing it with a fresh raw material gases.

Although as an atmosphere gas one or more of inert gases such as argon, helium, xenon; and hydrogen may be used, it is required that the atmosphere gas includes hydrogen.

In this case, as the hydrogen which is supplied to the reaction furnace, it is possible to recycle the hydrogen which is contained in the exhaust gas discharged from the reaction furnace.

As a catalyst, a mixture of (a) transition metal such as iron, cobalt, molybdenum, or transition metal compounds such as ferrocene, metal acetate and (b) sulfur or a sulfur compound such as thiophene, ferric sulfide may be used.

An intermediate of the fine carbon fibrous structure is synthesized by gasifying a mixture of the above mentioned methane, benzene and catalyst as a raw material, supplying the gasified mixture into a reaction furnace along with a carrier gas such as hydrogen gas, etc., and subjecting the raw material to thermal decomposition at a temperature in the range of $800°$ C.-$1300°$ C. In the case that carbon sources, catalyst and hydrogen are supplied into the reaction furnace, it is preferable that the space velocity (i.e., (gas flow rate in the reaction furnace)/(sectional area of the reaction furnace), wherein the gas flow rate in the reaction furnace denotes the total gas flow rate including the raw material gas, catalyst gas and hydrogen at $0°$ C., 1 atm.) is regulated to 0.05-0.2 Nm/sec, from the viewpoint of obtaining the fine carbon fibrous structures which satisfy the "condition for the carbon fibrous structure according to the present invention".

The thermal decomposition reaction of methane and benzene as the raw materials mainly occurs on the surface of the catalyst particles or on growing surface of granular parts that have grown around the catalyst particles as the nucleus, and the fibrous growth of carbon may be achieved when the recrystallization of the carbons generated by the decomposition progresses in a constant direction. When obtaining carbon fibrous structures according to the present invention, however, the balance between the thermal decomposition rate and the carbon fiber growth rate is intentionally varied. Namely, for instance, as mentioned above, to use as carbon sources at least two kinds of carbon compounds having different decomposition temperatures may allow the carbonaceous material to grow three dimensionally around the granular part as a centre, rather than in one dimensional direction.

The three dimensional growth of the carbon fibers depends not only on the balance between the thermal decomposition rate and the growing rate, but also on the selectivity of the crystal face of the catalyst particle, residence time in the reaction furnace, temperature distribution in the furnace, etc. The balance between the decomposition rate and the growing rate is affected not only by the kinds of carbon sources mentioned above, but also by reaction temperatures, and gas temperatures, etc. Generally, however, when the growing rate is faster than the decomposition rate, the carbon material tends to grow into fibers, whereas when the thermal decomposition rate is faster than the growing rate, the carbon material tends to grow in peripheral directions of the catalyst particle. Accordingly, by changing the balance between the thermal decomposition rate and the growing rate intentionally, it is possible to control the growth of carbon material to occur in multi-direction rather than in single direction, and to produce three dimensional structures according to the present invention.

In order to form with ease the above mentioned three-dimensional configuration, where two granular parts connect by fine carbon fiber(s), with respect to the intermediate of the fine carbon fibrous structure to be produced, it is desirable to optimize the compositions such as the catalyst used, the residence time in the reaction furnace, the reaction temperature and the gas temperature. For instance, in the case that the transition metal compound and the sulfur compound are used as the catalyst, it is desirable that the molar ratio of sulfur compound/transition metal compound is in the range of from 0.01 to 10, preferably, in the range of from 0.05 to 7, and more preferably, in the range of from 0.1 to 5.

With respect to the method for manufacturing the intermediate of the fine carbon fibrous structure with efficiency, as another approach to the aforementioned one that two or more carbon compounds which have mutually different decomposition temperature are used in an appropriate mixing ratio, there is an approach that the raw material gas supplied into the reaction furnace from a supply port is forced to form a turbulent flow in proximity to the supply port. The "turbulent flow" used herein means a furiously irregular flow, such as flow with vortexes.

In the reaction furnace, immediately after the raw material gas is supplied into the reaction furnace from the supply port, metal catalyst fine particles are produced by the decomposition of the transition metal compound as the catalyst involved in the raw material gas. The production of the fine particles is carried out through the following steps. Namely, at first, the transition metal compound is decomposed to make metal atoms, then, plural number of, for example, about one hundred of metal atoms come into collisions with each other to create a cluster. At the created cluster state, it can not function as a catalyst for the fine carbon fiber. Then, the clusters are further aggregated by collisions with each other to grow into a metal crystalline particle of about 3-10 nm in size, and which particle comes into use as the metal catalyst fine particle for producing the fine carbon fiber.

During the catalyst formation process as mentioned above, if the vortex flows belonging to the furiously turbulent flow are present, it is possible that the collisions of carbon atoms or collisions of clusters become more vigorously as compared with the collisions only due to the Brownian movement of atoms or collisions, and thus the collision frequency per unit time is enhanced so that the metal catalyst fine particles are produced within a shorter time and with higher efficiency. Further, since concentration, temperature, and etc. are homogenized by the force of vortex flow, the obtained metal catalyst fine particles become uniform in size. Additionally, during the process of producing metal catalyst fine particles, a metal catalyst particles aggregate in which numerous metal crystalline particles were aggregated by vigorous collisions with the force of vortex flows can be also formed. Since the metal catalyst particles are rapidly produced as mentioned above and thus the surface area of the metal catalyst which functions as sites for the decomposition reaction of the carbon compound becomes larger, the decomposition of carbon compound can be accelerated so that an ample amount of carbonaceous material can be provided. Whereby, the fine carbon fibers grow up in a radial pattern by taking individual metal catalyst particles in the aggregate as nuclei. When the thermal decomposition rate of a part of carbon compounds is faster than the growing rate of the carbon material as previously described, the carbon material may also grow in the circumferential direction so as to form the granular part around the aggregate, and thus the intermediate of the fine carbon fibrous structure of the desired three dimensional configuration may be obtained with efficiency.

Incidentally, it may be also considered that there is a possibility that some of the metal catalyst fine particles in the aggregate are ones that have a lower activity than the other particles or ones that are deactivated on the reaction. If non-fibrous or very short fibrous carbon material layers grown by such catalyst fine particles before or after the catalyst fine particles aggregate are present at the circumferential area of the aggregate, the granular part of the intermediate of the carbon fibrous structure may be formed.

As a concrete means for creating the turbulence to the raw material gas flow near the supply port for the raw material gas, particularly, at a temperature range of 400-1000° C. which is deduced from the reaction kinetics and is considered as the range for production/formation of metal catalyst fine particles, for instance, it is adaptable to provide some type of collision member at a position where the raw material gas flow introduced from the supply port can be interfered by the collision section. The shape of the collision section is not particularly limited, as far as an adequate turbulent flow can be formed in the reaction furnace by the vortex flow which is created at the collision section as the starting point. For example, embodiments where various shapes of baffles, paddles, tapered tubes, umbrella shaped elements, and etc., are used singly or in varying combinations and located at one or more positions may be adaptable.

The intermediate of the fine carbon fibrous structure, obtained by producing/forming metal catalyst particles at 400° C.-1000° C., and then, heating the mixture of the catalyst and hydrocarbons at a constant temperature in the range of 800° C.-1300° C., has a structure that resembles sheets of carbon atoms laminated together, (and being still in half-raw, or incomplete condition). When analyzed with Raman spectroscopy, the D band of the intermediate is very large and many detects are observed. Further, the obtained intermediate is associated with unreacted raw materials, nonfibrous carbon, tar moiety, and catalyst metal.

Therefore, the intermediate is subjected to a high temperature heat treatment at 1800-2800° C. using a proper method in order to remove such residues from the intermediate and to produce the intended carbon fibrous structure that there are little defect at the granular parts and there are a proper number of defects at the carbon fiber parts.

For instance, the intermediate may be heated at 800-1300° C. to remove the unreacted raw material and volatile flux such as the tar moiety, and thereafter annealed at a high temperature of 1800-2800° C. to produce the intended structure and, concurrently, to vaporize the catalyst metal, which is included in the fibers, to remove it from the fibers. In order to inhibit the oxidation reaction, these heating treatments may be proceeded under an inert gas atmosphere, or with adding a small, amount of a reducing gas.

By annealing the intermediate at a temperature of 1800° C.-2800° C., the patch-like sheets of carbon atoms are rearranged to associate mutually, and then form multiple graphene sheet-like layers, wherein graphene layers which constitute the carbon fibers and graphene layers which constitute the granular parts are continued mutually at least at their surface areas. When the annealing temperature is less than 1800° C., the resultant product must have a relatively large number of defects, and thus there is a fear that the desired properties such as electrical conductivity, etc., can not be attained.

(2-2) The Case of using Methane, and Toluene and/or Xylene as Carbon Sources for Thermal Decomposition Reaction System In the case that methane, and toluene and/or xylene are Supplied into a reaction furnace, when the molar ratio of (methane/(toluene and/or xylene)) in a gas composition which is supplied into the reaction furnace, namely, in a gas composition at the inlet of the reaction furnace, is adjusted to exceed 1 and to be not more than 100, preferably, to be in the range of from 1.1 to 50, more preferably, in the range of from 2 to 30, and the percentage of hydrogen by volume in the gas composition which is supplied into the reaction furnace is adjusted to be not less than 70% and to be less than 100%, preferably, to be in the range of from 75% to 95%, more preferably, in the range of from 78% to 90%, it becomes possible to obtain the fine carbon fibrous structures which satisfy the "condition for the carbon fibrous structure according to the present invention".

The descriptions in the above mentioned (2-1) section, "The case of using methane, and toluene and/or xylene as carbon sources for thermal decomposition reaction system", except the description about the percentage of hydrogen by volume in the gas composition which is supplied into the reaction furnace, are adaptable to this section for the method for production of fine carbon fibrous structure using methane, and toluene and/or xylene as carbon sources for thermal decomposition reaction system.

Incidentally, as described in the above (2-1) section, also in the case of using methane, and toluene and/or xylene as carbon sources for thermal decomposition reaction system, relatively large amount of unreacted methane is remained in the exhaust gas, and thus the exhaust gas becomes a methane rich gas as compared with the methane/benzene ratio (theoretical value) in the introduced raw material gases. Thus, as the methane which is supplied to the reaction furnace, it is possible to recycle the methane which is contained in the exhaust gas discharged from the reaction furnace.

Further, as the hydrogen which is supplied to the reaction furnace, it is also possible to recycle the hydrogen which is contained in the exhaust gas discharged from the reaction furnace.

Incidentally, the respective physical properties in the present invention are measured by the following protocols.

<Median Diameter, D1 of Diameters of Carbon Fibers>

First, a photograph of carbon fibrous structures of the present invention was taken with SEM (1000x-5000x magnification). On the taken SEM photo, with respect to one fiber in each individual carbon fibrous structure, the thickness of the fiber was measured, in the direction perpendicular to the direction along which the fiber is elongated, using the image analysis software, WinRoof™ (trade name, marketed by Mitani Corp.), and the obtained data were converted into numbers, and the median diameter, D1, of diameters of carbon fibers was calculated. Using all carbon fibrous structures that can be taken as objects in one single field of view (approximately, 60-80 pieces), about 200 pieces in total were measured with three fields of views.

<Median Length of Carbon Fibers>

First, a photograph of carbon fibrous structures of the present invention was taken with SEM (1000x-5000x magnification). On the taken SEM photo, with respect to each fiber in each individual carbon fibrous structure, the fiber length which includes from the centre of the granular part to the end of the elongated fine carbon fiber was measured, using the image analysis software, WinRoof™ (trade name, marketed by Mitani Corp.), and the obtained data were converted into numbers, and the median length of carbon fibers was calculated. Using all carbon fibrous structures that can be taken as objects in one single field of view (approximately, 60-80-pieces), about 200 pieces in total were measured with three fields of views.

<Area-Based Circle-Equivalent Median Diameter, D2, of the Granular Part, and Median Value of Roundness>

First, a photograph of carbon fibrous structures of the present invention was taken with SENM (1000x-5000x magnification). On the taken photo, assuming each granular part which is the binding site of mutual fine carbon fibers is a particle, contours of the individual granular parts were traced using the image analysis software, WinRoof™ (trade name, marketed by Mitani Corp.), and area within each individual contour was measured. Circle-equivalent median diameter, $D_2$, based on area of each individual granular part was calculated, and then, the calculated data were converted into numbers, and it was defined as the area—based circle—equivalent diameter, D2, of each individual granular part in the carbon fibrous structure.

Roundness (R) was determined by inputting value of the area (A) within each individual contour computed using the above mentioned image analysis software, and a measured value of each individual contours length (L) to the following equation to calculate the median value of roundness of each individual granular part, and then, the value was converted into numbers.

$$R=A*4\pi/L^2 \qquad \text{[Numerical Formula 1]}$$

Upon the determination of above properties, only carbon fibrous structures with a clear contour on the taken SEM photo were adapted as objects to be measured, and broken ones with unclear contours were omitted. Using all carbon fibrous structures that can be taken as objects in one single field of view (approximately, 60-80 pieces), about 200 pieces in total were measured with three fields of views.

<Measurement of Bulk Density>

1 g of powder was placed into a 70 mm caliber transparent cylinder equipped with a distribution plate, then air supply at 0.1 Mpa of pressure, and 1.3 liter in capacity was applied from the lower side of the distribution plate in order to blow off the powder and thereafter allowed the powder to settle naturally. After the fifth air blowing, the height of the settled powder layer was measured. Any 6 points were adopted as the measuring points, and the average of the 6 points was calculated in order to determine the bulk density.

<Raman Spectroscopic Analysis>

The Raman spectroscopic analysis was performed with the equipment LabRam 800 manufactured by HORIBA JOCBN YVON, S.A.S., and using 514 nm of argon laser.

<Oxidation Temperature>

Oxidation temperature of the carbon fibrous structure was determined by using TG-DTA manufactured by MAC SCIENCE CO. LTD., weighing about 10 mg of carbon fibrous structures with a balance, placing the weighed carbon fibrous structures on a alumina crucible, and heating the carbon fibrous structure at a heating rate of 10° C./minute while air was circulated at air flow rate of 0.1 liter/minute and. The temperature at the top position of the exothermic peak in DTA was determined as the oxidation temperature.

<Particle Electric Resistance and Restoration Ability>

1 g of fine carbon fibrous structures were scaled, and then press-loaded into a resinous die (inner dimensions: L 40 mm×W 10 mm×H 80 mm), and the displacement and load were read out. A constant current was applied to the powder by the four-terminal method, and in this condition the voltage was measured. After measuring the voltage until the density came to 0.9 g/cm³, the applied pressure was released and the density after decompression was measured. Measurements taken when the powder was compressed to 0.2, 0.8 or 0.9 g/cm³ were adopted as the particle electric resistance.

EXAMPLES

Hereinafter, this invention will be illustrated in detail by practical examples.

Examples 1-4, and Control 1

Figure 3:
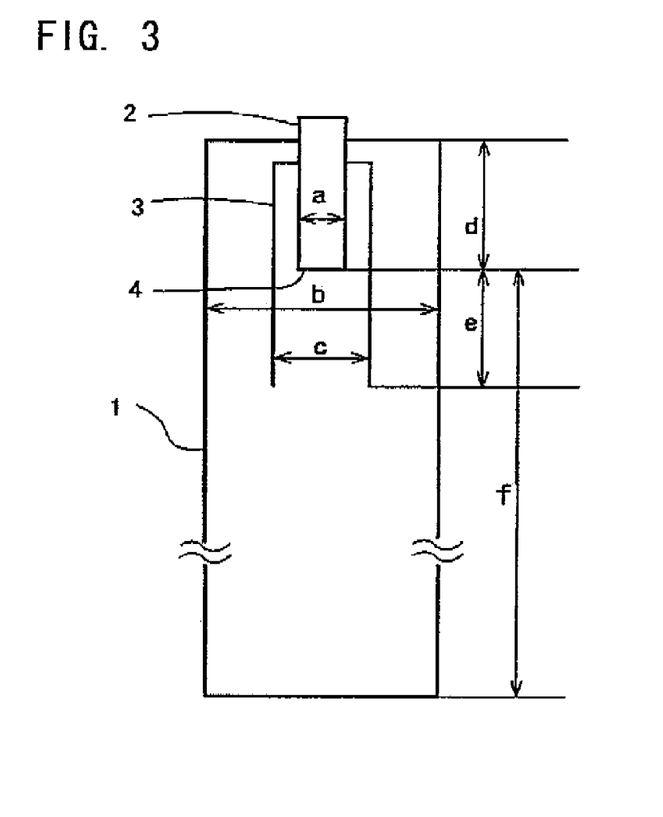
FIG. 3 is a schematic diagram illustrating the reaction furnace used in Examples and Control.

By the CVD process, fine carbon fibrous structures were synthesized using the reaction furnace as shown in FIG. 3, and using carbon sources as shown in Table under the conditions as shown in Table 1.

The synthesis was carried out in the presence of a mixture of ferrocene and thiophene as the catalyst (weight ratio of thiophene/ferrocene=1/4, i.e. atom ratio of S/Fe=0.55) and under the reducing atmosphere of hydrogen gas. Methane, aromatic hydrocarbon(s), and the catalyst were heated to 380° C. along with the hydrogen gas, and then they were supplied to the reaction furnace, and underwent thermal decomposition at 1300° C. in order to obtain the first intermediate of carbon fibrous structures.

The reaction furnace 1 used was, as shown in FIG. 3, equipped at the upper part thereof with a inlet nozzle 2 for introducing the raw material mixture gas comprising carbon source, catalyst and hydrogen gas as aforementioned into the reaction furnace 1. Further, at the outside of the inlet nozzle 2, a cylindrical-shaped collision member 3 was provided. The collision member 3 was set to be able to interfere in the raw material gas flow introduced frown the raw material supply port 4 located at the lower end of the inlet nozzle 2. In the reaction furnace 1 used in this Examples, given that the inner diameter of the inlet nozzle 2, the inner diameter of the generation furnace 1, the inner diameter of the cylindrical-shaped collision member 3, the distance from the upper end of the generation furnace 1 to the raw material mixture gas supply port 4, the distance from the raw material mixture gas supply port 4 to the lower end of the collision member 3, and the distance from the raw material mixture gas supply port 4 to the lower end of the generation furnace 1 were "a", "b", "c", "d", "e", and "f", respectively, the ratio among the above dimensions was set as a:b:c:d:e:f=1.0:3.6:1.8:3.2:2.0:21.0.

The first intermediate thus synthesized was baked at 900° C. in nitrogen gas in order to remove tar, etc., and to obtain a second intermediate.

Further, the second intermediate underwent a high temperature heat treatment at 2600° C. The obtained fine carbon fibrous structures underwent pulverization using an air mill in order to produce fine carbon fibrous structures (annealed product).

A sample for electron microscopes was prepared by dispersing ultrasonically the obtained fine carbon fibrous structures of Example 1 into toluene. FIG. 1 and FIG. 2 show TEM photos of the sample.

With respect to fine carbon fibrous structures of each individual Examples and Control, the particle electric resistance was determined. The results are shown in Table 1. In Examples 1 to 4, extremely excellent values of the particle electric resistance which were not attained in the prior art were obtained.

Incidentally, in Table 1, the obtained results for various physical properties mentioned above other than the particle electric resistance are also illustrated.

TABLE 1

| | Aromatic hydrocarbon supplied into reaction furnace | Molar rate of methane/ aromatic hydrocarbon in gas supplied into reaction furnace (-) | Volume percentage of hydrogen (%) | Space velocity (Nm/s) | $D_1$ (nm) | $D_2$ (μm) | $D_2/D_1$ (-) | Median length of carbon fibers (μm) | Median value of degree of roundness (-) |
|---|---|---|---|---|---|---|---|---|---|
| Ex. 1 | Toluene | 7.4 | 88 | 0.09 | 29 | 0.283 | 9.1 | 10.4 | 0.89 |
| Ex. 2 | Toluene | 7.8 | 85 | 0.09 | 25 | 0.183 | 7.3 | 9.6 | 0.87 |
| Ex. 3 | Toluene | 4.9 | 88 | 0.09 | 48 | 0.314 | 6.5 | 7.8 | 0.80 |
| Ex. 4 | Toluene | 15 | 94 | 0.09 | 35 | 0.325 | 0.3 | 8.1 | 0.85 |
| Ex. 5 | Toluene | 20 | 90 | 0.09 | 32 | 0.341 | 10.6 | 9.3 | 0.87 |
| Ex. 6 | Xylene | 10 | 92 | 0.09 | 30 | 0.325 | 10.8 | 7.9 | 0.86 |
| Ex. 7 | Benzene | 3.6 | 88 | 0.09 | 59 | 0.323 | 5.5 | 8.0 | 0.79 |
| Ex. 8 | Benzene | 15 | 25 | 0.09 | 45 | 0.363 | 8.1 | 8.3 | 0.81 |
| Ctrl. 1 | Toluene | 2.3 | 67 | 0.10 | 112 | 0.454 | 4.1 | 6.5 | 0.76 |

| | Bulk density × 1000 (g/cm³) | Bulk density after decompression (g/cm³) | Particle electric resistance (Ω·cm) at 0.2 g/cm³ | at 0.8 g/cm³ | at 0.9 g/cm³ | Oxidation temperature (° C.) | $I_D/I_G$ |
|---|---|---|---|---|---|---|---|
| Ex. 1 | 2.3 | 0.30 | 0.0378 | 0.0068 | 0.0059 | 707 | 0.000 |
| Ex. 2 | 1.6 | 0.27 | 0.0270 | 0.0056 | 0.0049 | 696 | 0.099 |
| Ex. 3 | 3.4 | 0.24 | 0.0553 | 0.0091 | 0.0079 | 775 | 0.092 |
| Ex. 4 | 2.2 | 0.28 | 0.0310 | 0.0062 | 0.0053 | 762 | 0.091 |
| Ex. 5 | 2.6 | 0.27 | 0.0405 | 0.0070 | 0.0052 | 778 | 0.083 |
| Ex. 6 | 2.5 | 0.28 | 0.0383 | 0.0069 | 0.0050 | 780 | 0.088 |
| Ex. 7 | 4.0 | 0.26 | 0.0599 | 0.0089 | 0.0077 | 807 | 0.090 |
| Ex. 8 | 3.2 | 0.29 | 0.0541 | 0.0083 | 0.0075 | 787 | 0.091 |
| Ctrl. 1 | 18.8 | 0.34 | 0.3193 | 0.0248 | 0.0208 | 832 | 0.094 |

The invention claimed is:

1. Fine carbon fibrous structure which comprises carbon fibers and granular parts, wherein at least two granular parts connect by at least one of the carbon fibers; wherein the fine carbon fibrous structure have a $D_2/D_1$ ratio of 1.3 to 10, wherein the $D_1$ is the median diameter of outer diameters of the carbon fibers and the $D_2$ is the area-based circle-equivalent median diameter of the particles; wherein the granular parts have a D2 of 0.05 to 0.4 μm; wherein the carbon fibers have a median length of not more than 20 μm; wherein the granular parts are produced in a growth process of the carbon fibers; and wherein at least a graphene layer which exists on and constitutes the surface of each granular part is continued on a graphene layer which exists on and constitutes the surface of the carbon fiber which connects between the granular parts.

2. The fine carbon fibrous structure according to claim 1, wherein the median value of degrees of roundness of the granular parts is in the range of from 0.5 to <1.

3. The fine carbon fibrous structure according to claim 1, wherein the bulk density of the fine carbon fibrous structures is in the range of from $1\times10^{-3}$ g/cm$^3$ to $5\times10^{-2}$ g/cm$^3$.

4. The fine carbon fibrous structure according to claim 1, wherein the density after decompression of the carbon fibrous structure is in the range of from 0.1 g/cm$^3$ to 0.5 g/cm$^3$.

5. The fine carbon fibrous structure according to claim 1, wherein the $I_D/I_G$ ratio of the carbon fibrous structure, wherein the $I_D/I_G$ is calculated from measurement values determined by Raman spectroscopic analysis using 514 nm light of the argon laser, is not more than 0.1.

6. Method for production of fine carbon fibrous structure, which comprises supplying methane, benzene, a catalyst and hydrogen into a reaction furnace in accordance with the vapor phase production method for carbon fiber, wherein the molar ratio of (methane/benzene) in a gas composition which is supplied into the reaction furnace exceeds 1 and is not more than 100; wherein the percentage of hydrogen by volume in the gas composition which is supplied into the reaction furnace is not less than 10% and is less than 100%, wherein the percentage of hydrogen by volume is determined at 0° C.; and wherein the carbon fiber produced is a fine carbon fibrous structure which satisfies the following condition:

<Fine carbon fibrous structure>
Fine carbon fibrous structure which comprises carbon fibers and granular parts, wherein at least two granular parts connect by at least one of the carbon fibers; wherein the fine carbon fibrous structure have a $D_2/D_1$ ratio of 1.3 to 10, wherein the $D_1$ is the median diameter of outer diameters of the carbon fibers and the $D_2$ is the area-based circle-equivalent median diameter of the particles; wherein the granular parts have a $D_2$ of 0.05 to 0.4 μm; wherein the carbon fibers have a median length of not more than 20 μm; wherein the granular parts are produced in a growth process of the carbon fibers; and wherein at least a graphene layer which exists on and constitutes the surface of each granular part is continued on a graphene layer which exists on and constitutes the surface of the carbon fiber which connects between the granular parts.

7. Method for production of fine carbon fibrous structure, which comprises supplying methane, toluene and/or xylene, a catalyst and hydrogen into a reaction furnace in accordance with the vapor phase production method for carbon fiber, wherein the molar ratio of (methane/(toluene and/or xylene)) in a gas composition which is supplied into the reaction furnace exceeds 1 and is not more than 100; wherein the percentage of hydrogen by volume in the gas composition which is supplied into the reaction furnace is not less than 70% and is less than 100%; and wherein the carbon fiber produced is a fine carbon fibrous structure which satisfies the following condition:

<Fine carbon fibrous structure>
Fine carbon fibrous structure which comprises carbon fibers and granular parts, wherein at least two granular parts connect by at least one of the carbon fibers; wherein the fine carbon fibrous structure have a $D_2/D_1$ ratio of 1.3 to 10, wherein the D1 is the median diameter of outer diameters of the carbon fibers and the $D_2$ is the area-based circle—equivalent median diameter of the particles; wherein the granular parts have a $D_2$ of 0.05 to 0.4 μm; wherein the carbon fibers have a median length of not more than 20 μm; wherein the granular parts are produced in a growth process of the carbon fibers; and wherein at least a graphene layer which exists on and constitutes the surface of each granular part is continued on a graphene layer which exists on and constitutes the surface of the carbon fiber which connects between the granular parts.

8. The method for production of fine carbon fibrous structure according to claim 6, wherein the gas supplied into the reaction furnace is forced to form a turbulent flow when the temperature of the gas supplied into the reaction furnace is in the range of 400-1000° C.

9. The method for production of fine carbon fibrous structure according to claim 6, wherein the methane supplied into the reaction furnace is supplied-by recycling methane included in exhaust gas discharged from the reaction furnace.

10. The method for production of fine carbon fibrous structure according to claim 6, wherein the hydrogen supplied into the reaction furnace is supplied by recycling hydrogen included in exhaust gas discharged from the reaction furnace.

11. The method for production of fine carbon fibrous structure according to claim 7, wherein the gas supplied into the reaction furnace is forced to form a turbulent flow when the temperature of the gas supplied into the reaction furnace is in the range of 400-1000° C.

12. The method for production of fine carbon fibrous structure according to claim 7, wherein the methane supplied into the reaction furnace is supplied by recycling methane included in exhaust gas discharged from the reaction furnace.

13. The method for production of fine carbon fibrous structure according to claim 7, wherein the hydrogen supplied into the reaction furnace is supplied by recycling hydrogen included in the exhaust gas discharged from the reaction furnace.

* * * * *